(12) United States Patent
Poustchi et al.

(10) Patent No.: US 7,751,537 B2
(45) Date of Patent: *Jul. 6, 2010

(54) PEER TO PEER VOICE OVER IP NETWORK WITH DISTRIBUTED CALL PROCESSING

(75) Inventors: Behrouz Poustchi, Kanata (CA); Jeroen De Witte, Kanata (CA)

(73) Assignee: Avaya Canada Corp., Halifax, Nova Scotia (CA)

( * ) Notice: Subject to any disclaimer, the term of this patent is extended or adjusted under 35 U.S.C. 154(b) by 1955 days.

This patent is subject to a terminal disclaimer.

(21) Appl. No.: 10/740,405

(22) Filed: Dec. 22, 2003

(65) Prior Publication Data

US 2004/0156485 A1    Aug. 12, 2004

Related U.S. Application Data

(60) Provisional application No. 60/434,813, filed on Dec. 20, 2002.

(51) Int. Cl.
 H04M 11/06   (2006.01)

(52) U.S. Cl. .............. 379/88.18; 379/88.16; 379/88.22; 379/202.01; 379/212.01; 379/220.01; 714/4; 714/13

(58) Field of Classification Search .............. 379/88.14, 379/88.17, 211.02, 220.01, 88.18, 88.16, 379/88.22, 88.25, 178, 201.03, 243, 202.01, 379/212.01; 709/250, 206; 704/270.1; 714/4, 714/13; 370/352
See application file for complete search history.

(56) References Cited

U.S. PATENT DOCUMENTS

| | | | |
|---|---|---|---|
| 5,172,404 A | | 12/1992 | Hashimoto |
| 5,963,618 A | * | 10/1999 | Porter ..................... 704/270.1 |
| 6,134,317 A | * | 10/2000 | Shaffer et al. ............... 379/243 |
| 6,163,606 A | * | 12/2000 | Otto ...................... 379/211.02 |
| 6,263,064 B1 | * | 7/2001 | O'Neal et al. .......... 379/201.03 |
| 6,434,143 B1 | | 8/2002 | Donovan ..................... 370/356 |
| 6,442,268 B1 | | 8/2002 | Klaghofer et al. ........... 379/229 |
| 6,445,694 B1 | * | 9/2002 | Swartz ....................... 370/352 |
| 6,542,584 B1 | * | 4/2003 | Sherwood et al. ........ 379/88.18 |

(Continued)

FOREIGN PATENT DOCUMENTS

EP    0794650    9/1997

(Continued)

*Primary Examiner*—Gerald Gauthier
(74) *Attorney, Agent, or Firm*—Muncy, Geissler, Olds & Lowe, PLLC

(57) ABSTRACT

A network device has a voice mail module adapted to provide voice mail functionality for calls of a first type directed to the network device. The calls of the first type are originally intended for the network device. The voice mail module also provides voice mail functionality for calls of a second type directed to the network device. The calls of the second type are originally intended for one or more other network devices in respect of which the network device has been designated as a backup. In a system having such network devices, voice mail functionality may be provided locally at the network devices. The network devices may be implemented as telephones. In the event that a network device is no longer available on the network, another network device designated as a backup network device takes voice mail messages for the network device that is unavailable. This significantly improves overall system reliability and availability.

53 Claims, 10 Drawing Sheets

U.S. PATENT DOCUMENTS

| | | |
|---|---|---|
| 6,553,102 B1 * | 4/2003 | Fogg et al. ............... 379/88.25 |
| 6,665,379 B1 * | 12/2003 | Brown et al. ............. 379/88.18 |
| 6,671,356 B2 * | 12/2003 | Lewis ...................... 379/88.13 |
| 6,768,731 B1 | 7/2004 | Huh |
| 6,888,930 B1 * | 5/2005 | Hartselle et al. ......... 379/88.22 |
| 6,904,141 B2 * | 6/2005 | Jijina et al. ............ 379/211.02 |
| 6,947,969 B2 * | 9/2005 | Mann et al. ................. 709/206 |
| 7,012,998 B1 * | 3/2006 | Blackburn et al. ....... 379/88.18 |
| 7,046,772 B1 * | 5/2006 | Moore et al. ............. 379/88.25 |
| 7,054,423 B2 * | 5/2006 | Nebiker et al. ......... 379/201.01 |
| 7,127,613 B2 | 10/2006 | Pabla et al. |
| 7,162,013 B2 | 1/2007 | Gavette et al. |
| 7,177,412 B2 * | 2/2007 | Berlyoung et al. ..... 379/202.01 |
| 7,441,141 B2 * | 10/2008 | Poustchi et al. ................ 714/4 |
| 2003/0059014 A1 * | 3/2003 | Ross et al. ............. 379/201.01 |
| 2003/0059025 A1 * | 3/2003 | Meyerson et al. ...... 379/220.01 |
| 2005/0193249 A1 | 9/2005 | Poustchi et al. |
| 2005/0238148 A1 | 10/2005 | Poustchi et al. |

FOREIGN PATENT DOCUMENTS

| | | |
|---|---|---|
| WO | 0076158 | 12/2000 |

\* cited by examiner

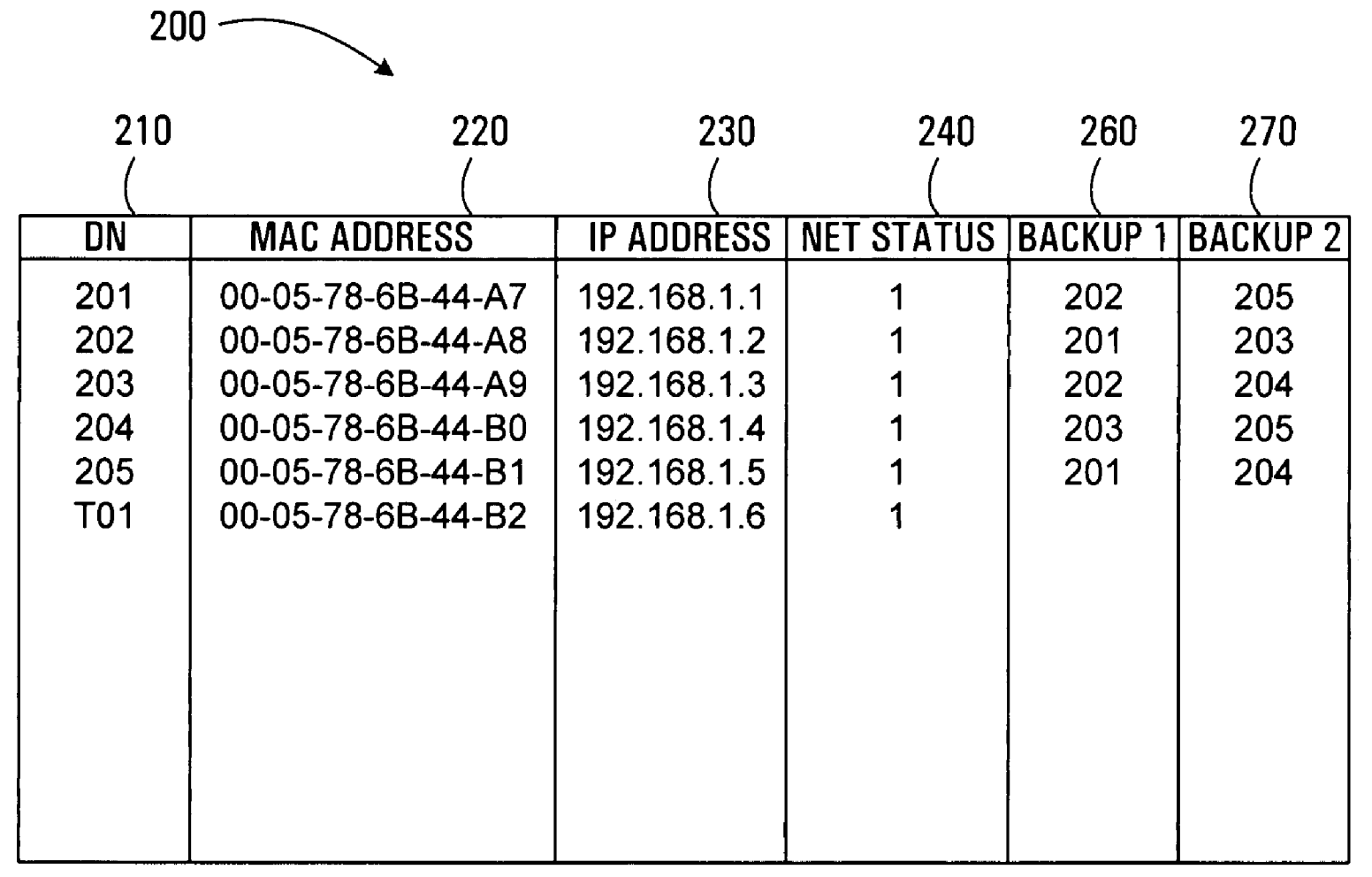

| DN | MAC ADDRESS | IP ADDRESS | NET STATUS | BACKUP 1 | BACKUP 2 |
|---|---|---|---|---|---|
| 201 | 00-05-78-6B-44-A7 | 192.168.1.1 | 1 | 202 | 205 |
| 202 | 00-05-78-6B-44-A8 | 192.168.1.2 | 1 | 201 | 203 |
| 203 | 00-05-78-6B-44-A9 | 192.168.1.3 | 1 | 202 | 204 |
| 204 | 00-05-78-6B-44-B0 | 192.168.1.4 | 1 | 203 | 205 |
| 205 | 00-05-78-6B-44-B1 | 192.168.1.5 | 1 | 201 | 204 |
| T01 | 00-05-78-6B-44-B2 | 192.168.1.6 | | | |

FIG. 5

PEER TO PEER VOICE OVER IP NETWORK WITH DISTRIBUTED CALL PROCESSING

RELATED APPLICATION

This Application claims the benefit of U.S. Provisional Application 60/434,813 filed Dec. 20, 2002.

FIELD OF THE INVENTION

This invention relates to a voice mail system, method and network devices, in for example, a distributed peer-to-peer network.

BACKGROUND OF THE INVENTION

Some modern communications solutions are based on VoIP (Voice-over IP (Internet Protocol)) technology, which is the transmission of calls over a data network based on the IP. The communication is in the form of packet data and thus there is no fixed connection as there would be in the case of switched networks. The communication can be text, voice, graphics or video. In order to simplify IP communication problems, standards have been developed and adopted in the industry. Examples of such standards are H.323 (Packet based communication systems) and SIP (Session Initiation protocol). These standards are followed when designing new hardware and software. The SIP standard covers the technical requirements to set-up, modify and tear down multimedia sessions over the Internet. A multimedia communication session between two endpoints will be referred to as a call.

Communication solutions, whether they be switch based or packet based, are defined and designed for a specific number of users and call processing capacity, generally defined by the number of ports (telephone terminations), and the amount of processing available on a central processing equipment that provides routing and call processing functionality. Hence, equipment vendors generally develop and market versions of the same product for different customer size and needs. However, a customer needs to upgrade to larger central processing equipment once the number of ports required and/or call-processing requirements exceed the capacity of the central processing equipment.

Costs associated with processing and memory have made inclusion of a call-processing engine on every telephone set prohibitively expensive. Hence, current multimedia communication systems use a central processing equipment and simple user terminal sets. These simple user terminal sets are referred to as "stimulus terminals" as they simply send user stimuli such as key presses to the central processing equipment. In large systems, the central processing equipment is generally a very powerful computer controlling a number of functions on circuit boards called line cards, which connect telephone sets to the computer. The central processing equipment receives hook-switch information and key presses known in the art as DTMF (Dual Tone Multi-Frequency) tones from the telephone sets, and provides feedback to the telephone sets for example by sending a dial-tone or a ringing tone to the telephone sets. By interpreting the key presses, the central processing equipment controls the interconnection of the telephone sets based on numbers dialed by the telephone sets.

Voice mail has been provided using a centralized voice mail equipment either integrated with or separate from the central call processing equipment. The centralized voice mail equipment is designed and built with a certain voice storage capacity and voice processing capability in which a number of simultaneous calls can be processed and stored at any given time. Again, since buying a large voice mail solution is generally expensive, customers generally start with a smaller voice mail solution, and upgrade to larger solutions when required. Upgrading adds costs and results in operation disruptions.

Another disadvantage of centralized voice mail equipment in a voice mail system is the lack of overall reliability and availability of the voice mail system. When the centralized voice mail equipment fails, the voice mail system is unable to take or retrieve messages. Manufacturers have taken steps to duplicate critical pieces of equipment such as power supplies, CPU (Central Processing Equipment), and disk drives, and in some cases duplicate whole systems to increase the overall availability of the system; however, this, once again, increases overall costs.

SUMMARY OF THE INVENTION

A network device has a voice mail module that provides voice mail functionality for calls directed towards the network device. Each call is originally intended for the network device or another network device of at least one other network device for which it has been designated as a backup network device. In a system having two or more of such network devices, voice mail functionality is provided locally at the network devices as opposed to relying on central processing equipment to provide voice mail functionality. The network devices may be implemented for example as telephone terminal sets. In the event that a network device is no longer available on a network, another network device designated as a backup network device takes voice mail messages for the network device that is unavailable. This improves overall system reliability and availability compared to systems that make use of central processing equipment.

In some embodiments of the invention, when a network device serving as a backup network device takes a message originally intended for another network device that is unavailable, the message is queued and later sent to the other network device for which the message was originally intended when the other network device becomes available. The network device provides a greeting specific to the network device and also provides other greetings specific to other network devices for which it is designated as a backup. As such, when a call from a caller is handled by the network device serving as a backup network device, a greeting specific to the network device for which the call was originally intended is played.

In accordance with one broad aspect, the invention provides a network device. The network device has a voice mail module adapted to provide voice mail functionality for calls of a first type directed to the network device, the calls of the first type being originally intended for the network device. The voice mail module also provides voice mail functionality for calls of a second type directed to the network device. Each call of the second type is originally intended for another network device of at least one other network device in respect of which the network device has been designated as a backup network device.

In some embodiments of the invention, the network device is for example one of a terminal set, a switch based telephone, a packet based telephone, a VoIP (Voice over Internet Protocol) telephone, a video phone, a TTI (Thin Trunk Interface), a gateway device, a PC (Personal Computer), a server, a PDA (Personal Digital Assistant), a wireless device, and a wireless telephone.

In some embodiments of the invention, the network device receives a call forwarded from one of the other network devices and directs the forwarded call to the voice mail module. The voice mail module may be used to retrieve and play a greeting specific to one of the network device and the other network devices for which the call is intended. Furthermore, the voice mail module may record a message.

In some embodiments of the invention, upon connection of the network device within a network the voice mail module retrieves, from the other network devices, a greeting specific to the other network devices. Furthermore, in some embodiments of the invention, upon connection of the network device within the network, the voice mail module provides a respective greeting for the network device to at least one other network device that is designated as a backup network device for the network device.

In accordance with another broad aspect, the invention provides a voice mail system within a network. The voice mail system has two or more network devices with each network device having a voice mail module that provides voice mail functionality for calls of a first type directed to the network device, the calls of the first type being originally intended for the network device. The voice mail module also provides voice mail functionality for calls of a second type directed to the network device. Each call of the second type is originally intended for another network device of at least one other network device of the at least two network devices in respect of which the network device has been designated as a backup network device.

In accordance with another broad aspect, the invention provides a method of implementing voice mail. The method involves, at a network device providing voice mail functionality for calls of a first type directed to the network device, the calls of the first type being originally intended for the network device. The method also involves, at a second type directed to the network device. Each call of the second type is originally intended for another network device of at least one other network device in respect of which the network device has been designated as a backup network device.

In accordance with another broad aspect, the invention provides a method, implemented within a first network device for processing a call. The call is received and if the call is for the first network device: (i) an alert is generated on the first network device; (ii) if the call is not answered, a voice mail greeting is retrieved for the first network device and played; (iii) a first voice mail message is recorded for later playback; and (iv) a voice mail indicator is generated. If the call was originally destined for a second network device in respect of which the first network device is designated as a backup network device: (i) a greeting specific to the second network device to which the call was originally destined is retrieved and played; (ii) a second voice mail message is recorded; and (iii) the second voice mail message is forwarded to the second network device at a later time.

In some embodiments of the invention, the method involves: if the call was originally destined for a third network device other than the first network device and other than any network device in respect of which the first network device is designated as a backup network device: (i) retrieving a generic greeting and playing the generic greeting; (ii) recording a third voice mail message; and (iii) forwarding the third voice mail message to the third network device at a later time.

In accordance with another broad aspect, the invention provides an article of manufacture having a computer usable medium having computer readable program code means embodied therein for implementing voice mail at a network device. The computer readable code means in the article of manufacture has computer readable code means for providing voice mail functionality for calls of a first type directed to the network device, the calls of the first type being originally intended for the network device. The computer readable code means in the article of manufacture also has computer readable code means for providing voice mail functionality for calls of a second type directed to the network device. Each call of the second type is originally intended for another network device of at least one other network device in respect of which the network device has been designated as a backup network device.

BRIEF DESCRIPTION OF THE DRAWINGS

Preferred embodiments of the invention will now be described with reference to the attached drawings in which:

FIG. 5 is a routing table of a terminal set of FIG. 1;

DETAILED DESCRIPTION OF THE PREFERRED EMBODIMENTS

Embodiments of the invention provide a distributed peer-to-peer network voice mail functionality which is implemented locally on network devices. In voice mail systems, a user at a network device who attempts to communicate with someone else at another network device is given the option to leave a voice mail message. The voice mail message can later be retrieved and played to the person the voice mail message is intended. In some embodiments of the invention, network devices in a network provide voice mail functionality locally. In some embodiments of the invention, this voice mail functionality can be implemented as part of a call processing capability that incorporates other call processing features. An example implementation of an embodiment of the invention will be described in the context of call processing on a peer-to-peer distributed network, which incorporates voice mail, with reference to FIGS. 1 to 6.

Figure 1:
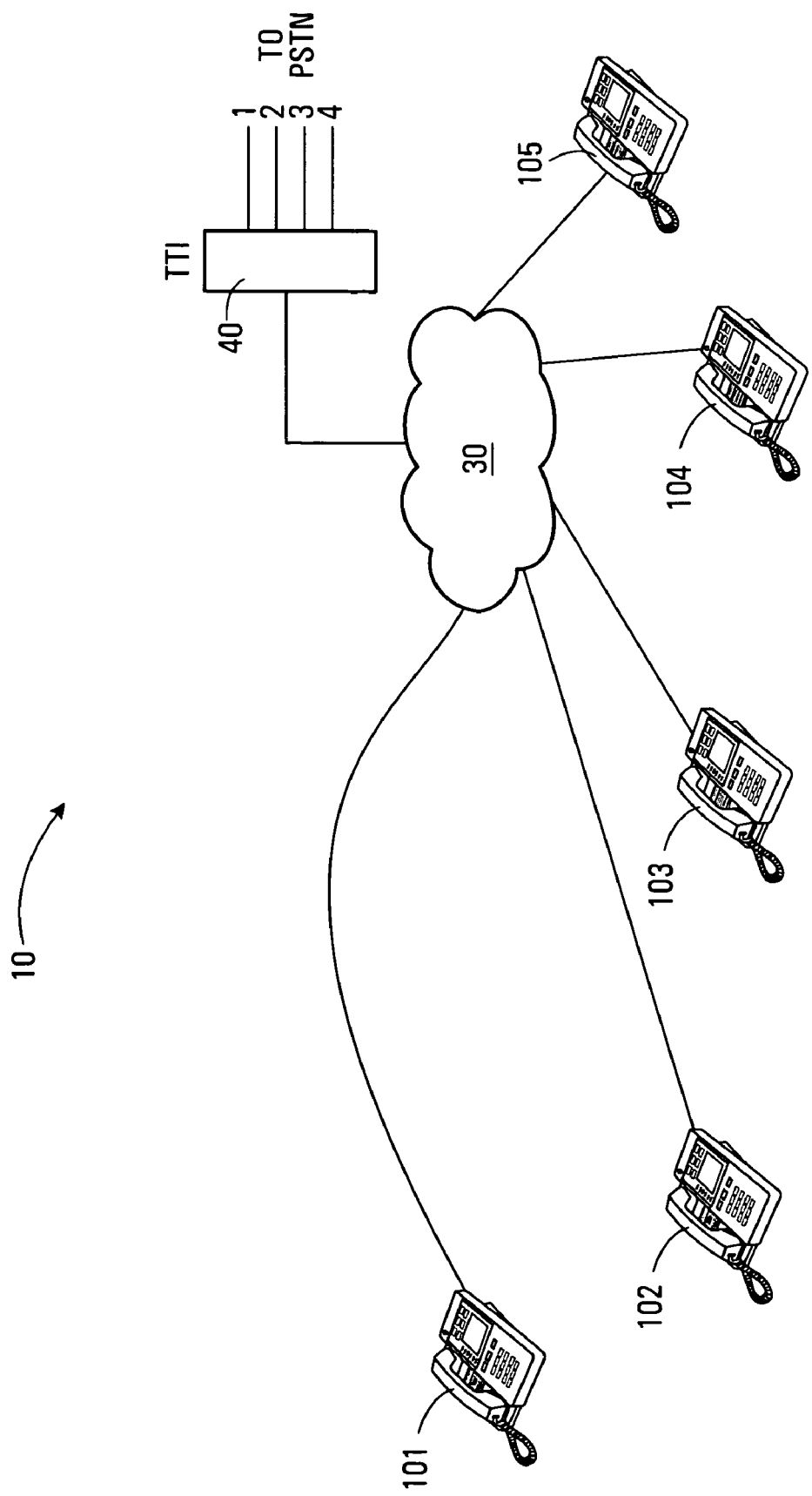
FIG. 1 is an example implementation of a system that makes use of network based distributed peer-to-peer call processing.

Referring to FIG. 1, shown is an example implementation of a system generally indicated by 10 which makes use of network based distributed peer-to-peer call processing. In addition to voice mail, in the example, call processing functionality such as call forwarding, call park and pickup, call transfer, and paging, and other features such as time synchronization, backup features, and peer discovery, may be provided locally at network devices within a network. Such features and functionality are described in U.S. Provisional Patent Application No. 60/441,481 entitled "DISTRIBUTED PEER-TO-PEER CALL TRANSFER SYSTEM, METHOD AND TELEPHONE TERMINALS" and filed Jan. 22, 2003; U.S. Provisional Patent Application No. 60/441,121 entitled "DISTRIBUTED PEER-TO-PEER CALL FORWARDING SYSTEM, METHOD AND TELEPHONE TERMINAL" and filed Jan. 21, 2003; U.S. Provisional Patent Application No. 60/473,877 entitled "DISTRIBUTED PEER-TO-PEER CALL PARK AND CALL PARK PICKUP SYSTEM, METHOD AND TELEPHONE TERMINALS" filed May 29, 2003; U.S. Provisional Patent Application Ser. No. 60/518,646 entitled "PEER-TO-PEER DISCOVERY SYSTEM, METHOD AND NETWORK DEVICES" filed Nov. 12, 2003; U.S. Provisional Patent Application Ser. No. 60/523,703 entitled "PEER BACK-UP IN A DISTRIBUTED PEER-TO-PEER NETWORK: SYSTEM, METHOD AND NETWORK DEVICES" filed Nov. 21, 2003; U.S. Provisional Patent Application Ser. No. 60/523,140 entitled "TIME SYNCHRONIZATION OF NETWORK DEVICES IN A NETWORK: SYSTEM, METHOD AND NETWORK DEVICE" filed Nov. 19, 2003; and U.S. Provisional Patent Application Ser. No. 60/524,041 entitled "SYSTEM, METHOD AND NETWORK DEVICES FOR PAGING IN A NETWORK" filed Nov. 24, 2003, all of which are incorporated herein by reference. It is to be clearly understood that embodiments of the invention are also provided which only provide voice mail.

The system 10 has a TTI (Thin Trunk Interface) 40 and five terminal sets 101, 102, 103, 104, 105 on a network 30. The network 30 may be for example a LAN (Local Area Network). In the example of FIG. 1 there are five terminal sets 101, 102, 103, 104, 105; however, more generally there are a total of N terminal sets where N≧2. Furthermore, in some implementations N can be a large number, for example in the thousands. The TTI 40 is, for example, a basic Analog or digital T1/E1 interface or any other suitable PSTN interface and provides a local central office or PSTN (Public Switched Telephone Network) interworking interface. The TTI 40 is coupled to a number of telephone "lines" 1, 2, 3, 4. Lines 1, 2, 3, 4 are wire pairs representative of facilities provided by a local central office or PSTN (not shown). In some implementations, there are many lines requiring multiple thin trunk interfaces. For example, in one implementation, 8 lines are required for connection to the PSTN and a second thin trunk interface is added to the system 10. It is to be understood that the system 10 of FIG. 1 is only a specific example of the incorporated subject matter. For example, in some implementations the network 30 form part of a larger network that is a collection of smaller networks interconnected by way of VPN (Virtual Private Network) connections for example.

In another example implementation there are two or more networks each having a TTI and at least one network device capable of providing voice mail functionality locally. An external call received from a network device on another network is routed through a respective TTI on the network on which the network device intended to receive the call resides. The network device receiving the external call provides local voice mail functionality for the external call if required. In the event that the network device intended to receive the call is unavailable the TTI through which the call is routed re-routes the call to another network device designated as a backup network device for the network device originally intended to receive the call.

Unlike conventional systems, the system 10 of FIG. 1 features distributed call processing, and a number of capabilities including distributed voice mail.

Figure 2:
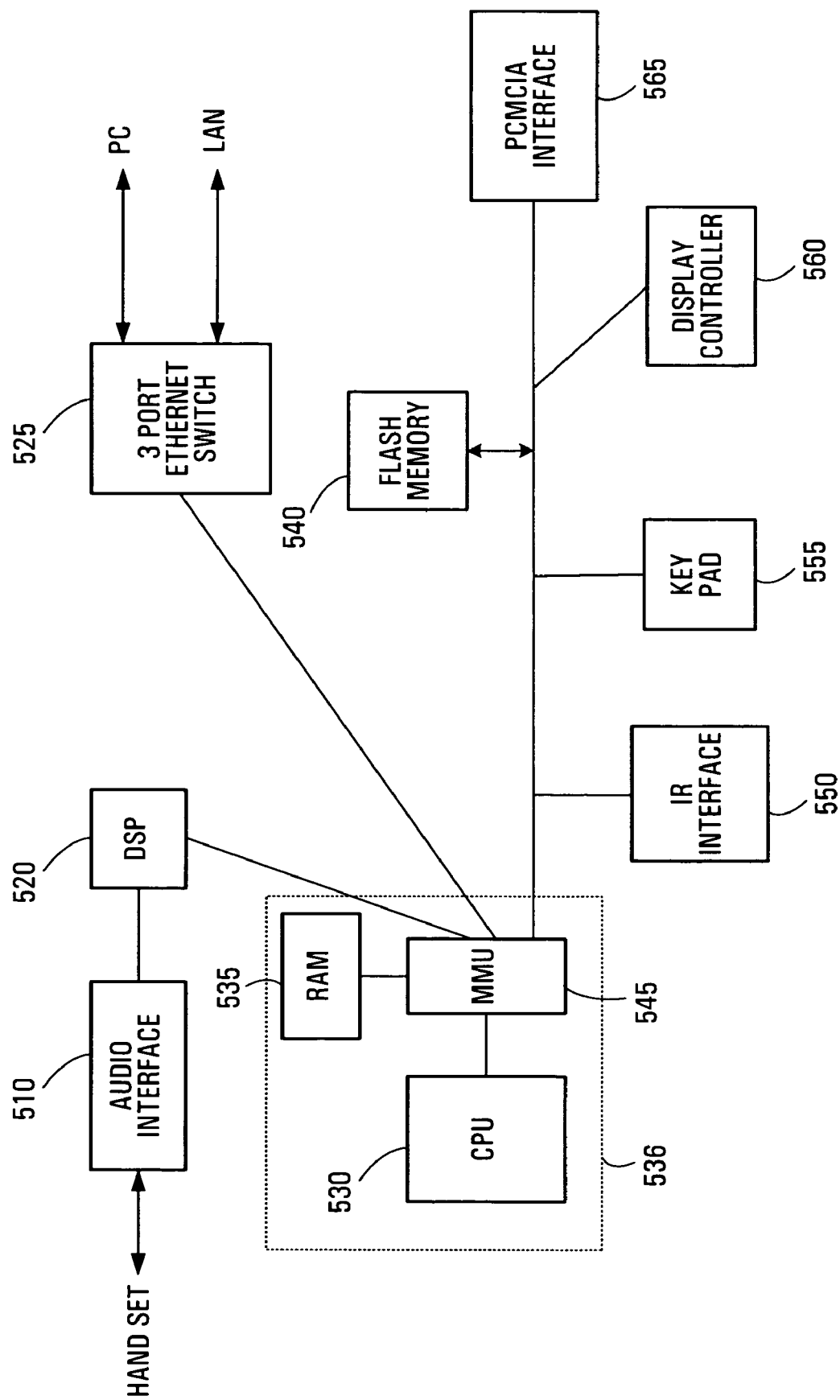
FIG. 2 is a partial circuit block diagram of a terminal set of the system of FIG. 1.

Referring to FIG. 2, shown is a partial circuit block diagram of terminal set 101 of FIG. 1. Terminal sets 102, 103, 104, 105 are similar to terminal set 101 and have a circuit that can be equally represented by the partial circuit block diagram of FIG. 2. A CPU (Central Processor Unit) 530, a MMU (Memory Management Unit) 545 and a RAM (Random Access Memory) 535 form a processing device 536. The processing device 536 is connected to a Digital Signal Processing (DSP) 520 for encoding and decoding audio signals. The DSP 520 is connected to an audio interface 510. The processing device 536 is also connected to a 3-port switch 525 to allow connection to the LAN 30 and/or a PC (Personal Computer). The processing device 536 is also connected to a non-volatile flash memory 540, an IR (Infra-Red) interface 550, a Keypad and button interface 555, an LCD (Liquid Crystal Display) controller 560, and a PCMCIA (Personal Computer Memory Card International Association) Interface 565 to allow for standardized expansion of the terminal set 101. While a specific architecture is shown in FIG. 2, it is to be understood that the invention is not limited to the architecture shown in FIG. 2. More generally, in some implementations, the a portion of or all of the functionality provided by the partial circuit block diagram of FIG. 2 is implemented on any network device, such as a terminal set, the TTI 40, and a PC (Personal Computer) for example. Preferably, the network device is a packet based telephone such as an IP (Internet Protocol) telephone terminal set. Other examples are video phone, PDA (Personal Digital Assistants), a wireless device or a wireless telephone that can be suitably programmed and configured to provide the distributed voice mail functionality described below. In some cases, the terminal sets are for example IP phones such as that manufactured by Mitel, Nortel, Avaya, Siemens, NEC, Pingtel or 3COM.

Figure 3:
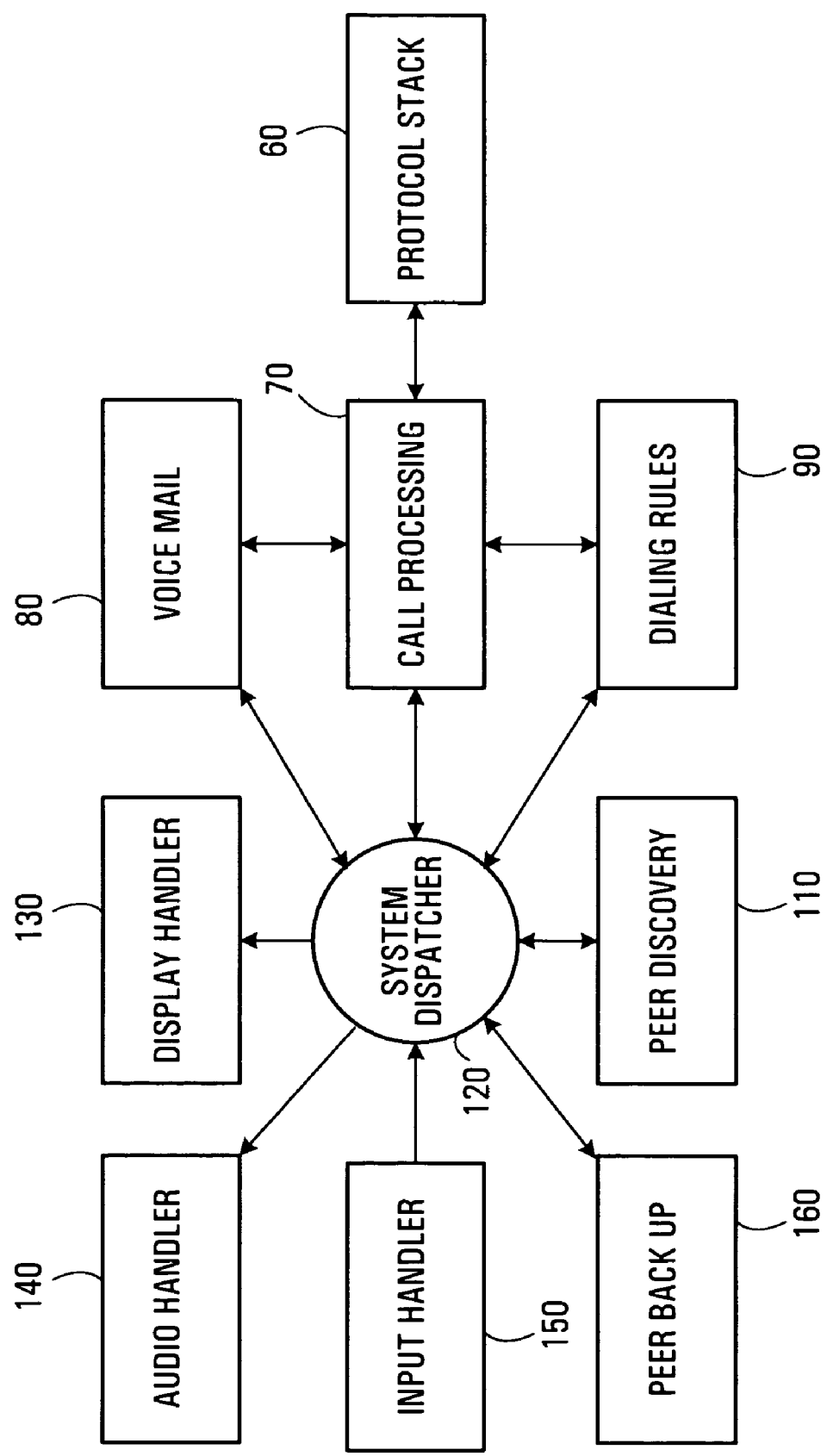
FIG. 3 is a functional block diagram of software operating on a terminal set of FIG. 1.

Referring to FIG. 3, shown is a functional block diagram of software operating on terminal set 101 of FIG. 1. The software will be described as operating on terminal set 101; however, it is to be understood that similar software is implemented in terminal sets 102, 103, 104, 105. Furthermore, in some cases, at least some of the features of the software described below are implemented in any network device such as the TTI 40 for example. The software is stored in RAM 535 of FIG. 2 and runs on the CPU 530. More generally, the software can be implemented as any suitable combination of instructions stored in memory for execution by general or special purpose processors, firmware, ASICs (Application Specific Integrated Circuits), FPGAs (Field-Programmable Gate Arrays), and general or special purpose logic. A system dispatcher 120 provides communication and scheduling between various functional elements which include a call processing module 70, a voice mail module 80, a dialing rules module 90, a peer discovery module 110, a display handler 130, an audio handler 140, an input handler 150, and a peer back-up module 160. The call processing module 70 also interfaces with a protocol stack 60.

FIG. 3 shows a detailed example of functions that may be included in a network device; however, it is to be understood that a network device need not have all of the functions shown in FIG. 3 and that in some implementations a network device will have only some of the functionality shown in FIG. 3. The display handler 130 formats information and displays the information to a user. The input handler 150 monitors inputs from for example key presses, hook switch, volume keys, and hands free and mute buttons and informs the system dispatcher 120. The system dispatcher 120 then distributes messages to other modules for further appropriate action to be taken. The audio handler 140 plays audio tones such as ringing, busy, and call waiting tones and/or connects to a handset speaker or speaker phone through a media call upon receipt of an audio message from the system dispatcher 120.

When terminal set 101 is initially connected to the network 30 it performs a peer discovery by executing the peer discovery module 110. At this point terminal set 101 undergoes a discovery of peer network devices such as terminal sets 102, 103, 104, 105 and TTI 40 by way of messages between terminal set 101 and terminal sets 102, 103, 104, 105 and TTI 40. Once the peer terminal sets are discovered, information is exchanged between the terminal set 101 and the peer network devices. At least part of the information exchanged in the messages is included in a routing table illustrated by way of example as shown in FIG. 5. The routing table is generally indicated by 200 and contains routing information for each of terminal sets 101, 102, 103, 104, 105 and TTI 40. A column 210 contains a DN (Directory Numbers) for each terminal 101, 102, 103, 104, 105. For example, in one case terminal sets 101, 102, 103, 104 have DNs 201, 202, 203, 204, 205 respectively. The DN uniquely identifies terminal sets 101, 102, 103, 104, 105 within the network 30. In the example implementation the TTI 40 is not a user dialable device. TTI 40 is given a different identifier T01 so that it can nonetheless be identified by other network devices. A column 220 has as entries a MAC (Media Access Control) address for each terminal set 101, 102, 103, 104, 105 and TTI 40. A column 230 has as entries an IP (Internet Protocol) address assigned to each terminal set 101, 102, 103, 104, 105 and TTI 40. A column 240 indicates a current network status of each terminal set 101, 102, 103, 104, 105 and TTI 40. For example, in one implementation a "1" indicates that a network device is up and running whereas a "0" indicates that the network device is un-available due to, for example, a failure.

In some implementations, a network device has one or more network devices designated to serve as backup network devices in the event the network device is unavailable to process a call. In particular, if a network device is unavailable to process a call, the call is re-directed to one of its designated backup network devices and the designated backup network device receiving the re-directed call provides call functionality for the network device that is unavailable. In the example of FIGS. 1 to 3 and 5 for each terminal set 101, 102, 103, 104, 105 there are two network devices designated as backup network devices which are identified in columns 260, 270 of the routing table 200. For example, network devices having DNs 202, 205 in columns 260, 270, respectively, are designated as backup network devices for terminal set 101 which has DN 201. In the example implementation, the TTI 40 (T01) is not backed up; however, as further discussed below in some implementations the TTI 40 is backed up by one or more network devices. As shown in the routing table 200, there are preferably two backup network devices designated for each network device; however, more generally, there is one or more backup network device designated for each network device. In our example implementation, in columns 260, 270 the backup network devices are identified by their DNs for clarity. Some implementations make use of DNs to identify backup network devices as illustrated. In other embodiments of the invention, MAC addresses are maintained in columns 260, 270 to identify the backup network devices. Furthermore, any unique identifier for the network devices may be used. The routing table 200 is shown as an illustrative example of the type of routing information that might be maintained; however, the invention is not limited to the illustrative example of FIG. 5 and in other implementations fewer or additional routing information is maintained in the routing table 200. More generally, the routing table 200 may contain any information on network devices, which is maintained for providing local functionality such as voice mail, call transfer, call forward, paging, and backup functionality. Other information that may also be maintained in table 200 might be for example, network device type identifiers, timestamps for synchronization purposes, network class identifiers for identifying a network class on which a network device is connected, and activity indicators identifying whether network devices are active. For purposes of providing backup functionality entries in columns 260, 270 are maintained. On a more simplified level, each network device maintains an identification of its designated backup network devices and an address for each designated backup network device. In particular, when a new network device is added to the network 30, the network device makes use of its peer discovery module 110 to obtain routing information pertaining to other network devices in the network 30 and makes use of the peer backup module 160 to designate two other network devices as backup network devices. In some implementations, maintaining column 260, 270 involves periodically redistributing backup designations to prevent, for example, a network device form continuously providing backup functionality for another network device that is prone to failure. Periodic redistribution of backup designations provides a fair distribution of workload in providing voice mail backup functionality among the network devices.

Referring back to FIG. 3, the dialing rules module 90 contains and/or applies a set of dialing rules for the call-processing module 70, which control how calls are directed. As an example of a dialing rule, a dialing rule might allow a terminal set to apply one or a set of filters to numbers dialed and if a match is found then the call is routed via a specific route to its destination.

The call-processing module 70 interacts with the protocol stack 60 to set up and tear down calls, and to set up media calls. When a call is received and a user is unable to answer the call because he or she is taking another call or because he or she is away from the terminal set, then the call is handled by the voice mail module 80.

The call processing modules of a number of network devices collectively serve to deliver PBX-like (Private Branch Exchange-like) call processing capabilities in a distributed fashion without the need for a PBX (Private Branch Exchange). For example, the call processing module 70 of terminal set 101 handles calls not only intended for terminal set 101 but also handles calls for other network devices for which it has been designated as a backup terminal set. This allows the voice mail module 80 to handle calls for the other network devices for which terminal set 101 has been designated as a backup terminal set. With reference to columns 210, 260 of the routing table 200, the network devices having DNs 202 and 205 both have designated as a first backup network device the network device having DN 201. As such, the network device having DN 201 provides voice mail functionality for calls not only intended for itself but also for calls intended for the network devices having DNs 202, 205. In particular, when the network device having DN 202 is unavailable, the network device having DN 201 will serve as a backup network device to provide voice mail functionality for calls intended for the network device having DN 202. Similarly, when network device having DN 205 is unavailable, the network device having DN 201 will serve as a backup network device to provide voice mail functionality for calls intended for the network device having DN 205.

Figure 4:
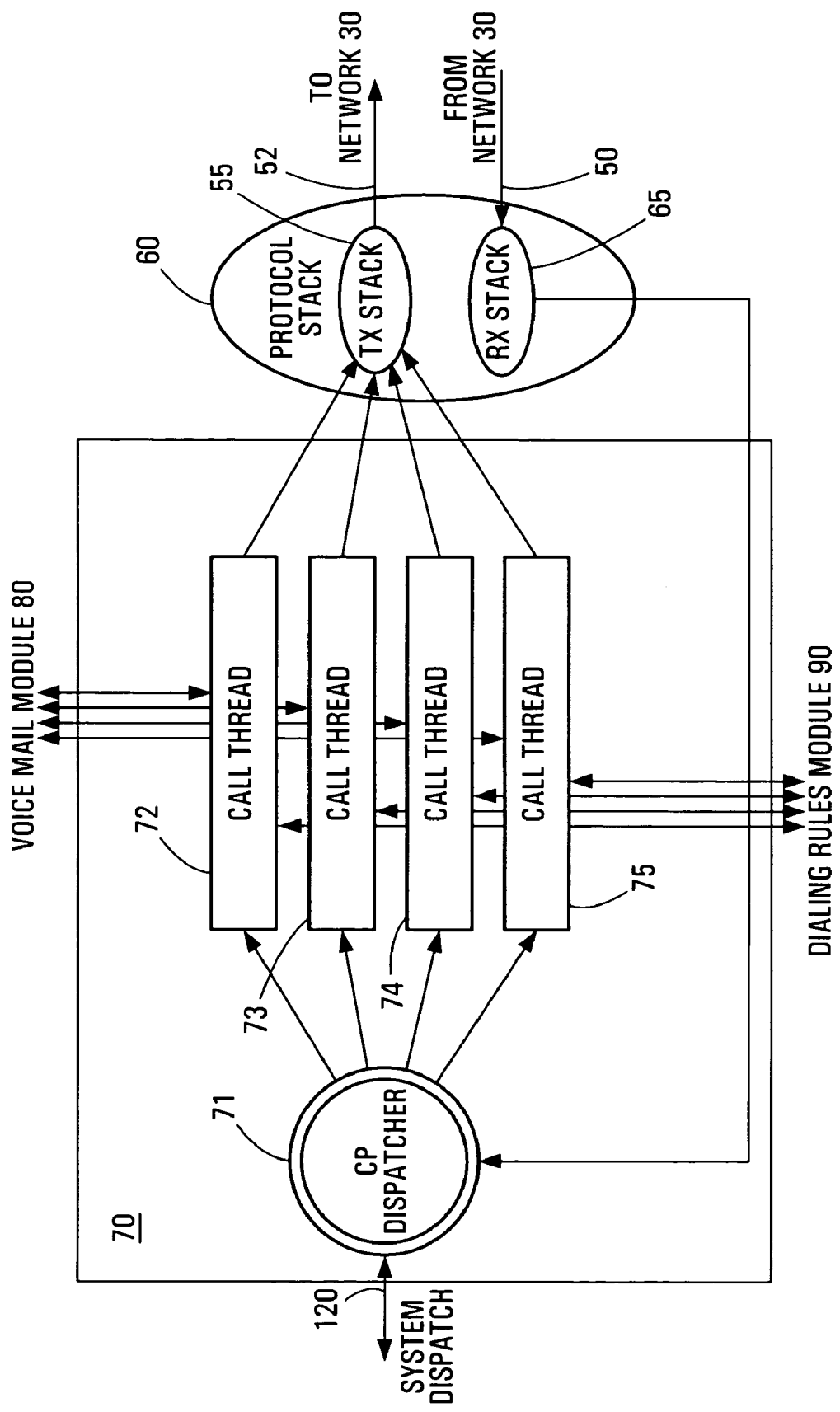
FIG. 4 is a functional block diagram of a call processing module of the software of FIG. 3.

An example implementation of the call processing module 70 together with the protocol stack 60 is shown in FIG. 4. In FIG. 4, the call processing module 70 has four call threads 72, 73, 74, 75 and a CP (Call Processor) dispatcher 71. The protocol stack 60 has a Tx (Transmit) stack 55 and an Rx (Receive) stack 65. Incoming calls are queued in the Rx stack

65 and outgoing calls are queued in the Tx stack 55. A channel 50 provides a connection to the network 30 for the incoming calls and a channel 52 provides a connection to the network 30 for the outgoing calls. The incoming and outgoing calls may be for example in the form of messages that are for example requests, responses to request, messages containing information such as routing information for other network device, messages containing information such as routing information from other network devices, and messages containing media information. The requests may be for example, requests for establishing connections, requests for terminating connections, or media data such as voice.

Each of the call threads 72, 73, 74, 75 is capable of handling a respective call. For example, a media call received by the terminal set 101 may be processed by the call thread 72, while a voice mail message may be recorded simultaneously on call thread 73. In addition, the call thread 74 might at the same time be involved in recording a voice mail message intended for another network device for which terminal set 101 is designated as a backup. The CP dispatcher 71 manages the call threads 72, 73, 74, 75 and performs scheduling of incoming and outgoing calls. In addition, the four call threads 72, 73, 74, 75 provide a mechanism for simultaneously handling 3-way conferencing plus voice mail. The invention is not limited to four call threads and in other implementations, there are two or more call threads. In some implementations in which there are two call threads, the two call threads might be used to simultaneously handle an incoming call and another call intended for voice mail.

When an incoming message for a call arrives at the protocol stack 60 through channel 50, the incoming message is queued in the Rx stack 65 and then sent to the CP Dispatcher 71. The CP dispatcher 71 determines the thread 72, 73, 74, 75 to which the call is to be sent and forwards the message to the determined thread. Each call thread 72, 73, 74, 75 is capable of interfacing with the voice mail module 80, the dialing rules module 90, the peer discovery module 110, the display handler 130, the audio handler 140, the input handler 150, and the peer backup module 160. The call threads 72, 73, 74, 75 are shown interfacing with the voice mail module 80 and the dialing rules module 90 only for purposes of clarity. The module or modules that a call thread interfaces with depends on the type of message being received or made. For example, if the message is intended for voice mail, the voice mail module 80 interfaces with the call thread. In response to the received message one of the call threads 72, 73, 74, 75 interfacing with one or more of the modules if necessary and generates a response message to the Tx stack 55 of the protocol stack 60 to be packaged and sent to a destination network device. The message contains information provided by one or more of the modules 80, 90, 110, 130, 140, 150, 160. The type of message being sent back to the network 30 depends on the state of the call thread. If, for example, the call received corresponds to an INVITE message for initiating a new call under a SIP (Session Initiation Protocol) then the response is an appropriate acknowledgement such as a RINGING message indicating that the terminal set is ringing or an OK message indicating that the call has been answered.

Figure 6:
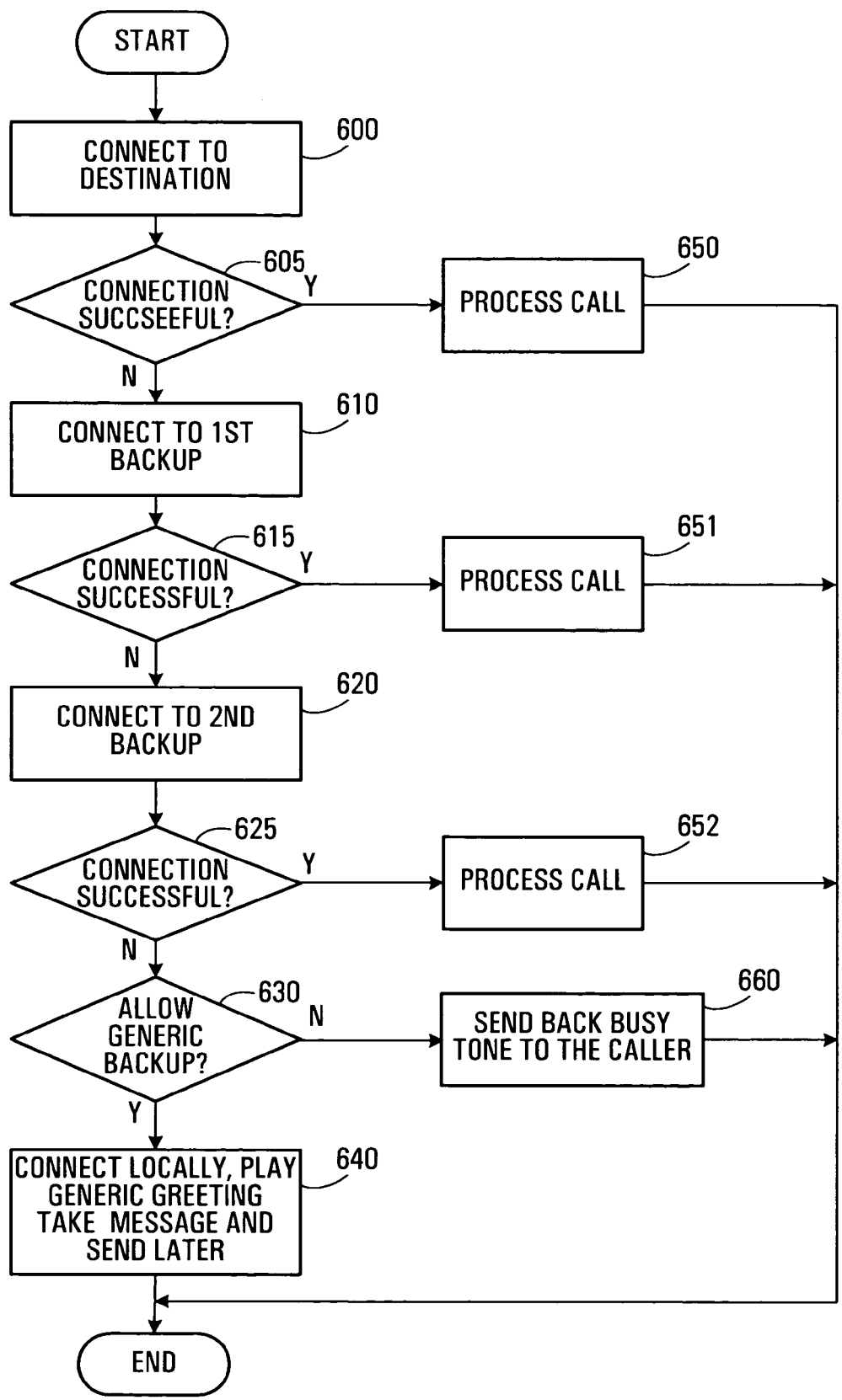
FIG. 6 is a flow chart of a method of initiating a call from one network device to another network device which might for example be employed in the system of FIG. 1.

Referring to FIG. 6, shown is a flow chart of a method of initiating a call from one network device to another network device which might for example be employed in the system 10 of FIG. 1. In particular, a caller at an originator network device wishes to call a person at a destination network device. At step 600, the originator network device attempts to establish a connection for a call with the destination network device. At step 605, if the connection is established the call is processed (step 650). The attempt may be unsuccessful due to for example one or more of a network failure, failure at the destination network device, the destination network device being unplugged and lack of resources at the destination network device to process a call. In some cases, the lack of resources might be due to for example all call threads at the destination network device being used simultaneously. At step 605 if the attempt is unsuccessful, then the originator network device looks up its routing information to determine which network device is to serve as a first backup network device for the destination network device and to determine an address for the first backup network device. The originator network device then initiates a call to the first backup network device by attempting to establish a connection using the address of the first backup network device (step 610). At step 615, if the attempt is successful and a connection is established with the first backup network device, the call is processed (step 651). Again, the attempt at the connection with the first backup network device may be unsuccessful and at step 615, if the attempt of step 610 fails, then the originator network device looks up its routing information to determine which network device is to serve as a second backup network device for the destination network device and to determine an address for the second backup network device. The originator network device then initiates a call to the second backup network device by attempting to establish a connection using the address of the second backup network device (step 620). At step 625, if the attempt is successful and a connection is established with the second backup network device, the call is processed (step 652). The originator network device has a generic call processing capability that allows the originator network device to take the call locally and provide voice mail functionality locally using a generic greeting. In particular, there is a user option for enabling the generic call processing capability. At step 625, if the attempt of step 620 is unsuccessful, a determination of whether the generic call processing capability is enabled is determined (step 630). At step 630, if the generic call processing capability is enabled a connection is established locally, a generic voice mail greeting is played and a voice mail message from the caller initiating the call is recorded and later sent to the destination network device when the destination network device becomes available (step 640). At step 630, if the generic voice mail functionality is disabled a busy tone is played to the caller (step 660).

Regarding processing at the destination network device, in one implementation at step 650 the call is processed with a ringing signal being generated for answering of the call by a user at the destination network device and only after a predetermined number of ring is a voice mail message taken. However, at steps 651, 652, 640, the call is directly processed by a call processing thread in cooperation with the voice mail module of the network device answering the call, whether it be a designated backup network device (step 651 or 652) or the originator network device (step 640).

Whether it be the destination network device (step 650), one of the designated backup network devices (step 651 or 652), or the originator network device (step 640), the network device that accepts the call preferably does so in a manner that is unique to the original destination telephone set. This might for example involve having each network device maintain its own specific voice mail greeting and other greetings specific to the network devices the designated as backup network devices. Furthermore, in some implementations, each network device maintains user options for handling voice mail and call forwarding.

In the method of FIG. 6, each network device is assigned two other network devices as backup network devices and as such there are up to two attempts at establishing connections with network devices designated as backup network devices (steps 610, 620). More generally, a network device has M other network devices designated as backup network devices with M≧1 and successive attempts at establishing connections with the M backup network devices are performed until one of the attempts is successful. If none of the attempts are successful then the call is handled locally as described with reference to steps 630, 640, 660. Furthermore, in some implementations, there is no generic call processing capability as described with reference to step 640 in which case when the attempt at step 625 is unsuccessful, the caller is provided with a busy tone (step 660).

In the example implementation of FIGS. 1 to 6, the TTI 40 is not backed up by another network device; however, in some implementation the TTI 40 is backed up by one or more other network devices. In some embodiments of the invention each network device is backed up by one or more network devices. Preferably, for each network device one or more network devices of the same type are designated as backup network devices. For example, in some embodiments of the invention a telephone terminal set has one or more other telephone terminal sets designated as backups and a TTI has one or more other TTIs designated as backups.

The method of FIG. 6 will now be described for a specific example in which a user at terminal set 101 of FIG. 1 attempts to make a call to terminal set 103. In this specific example terminal sets 101 and 103 correspond to the originator and destination network devices, respectively. In the specific example terminal sets 101, 102, 103, 104, 105 have DNs 201, 202, 203, 204, 205, respectively. As shown in columns 210, 260, 270 of the routing table 200, the network devices having DNs 202, 204 (terminal sets 102 and 104) are designated as backup network devices for the network device having DN 203 (the destination network device corresponding to terminal set 103). At step 600 terminal set 101 attempts to establish a connection for a call with terminal set 103. At step 605, if the connection is established the call is processed by terminal set 103 (step 650). At step 605 if the attempt is unsuccessful, then the terminal set 101 looks up its routing table 200 to determine from column 260 that terminal set 102 (DN 202) is to serve as a first backup terminal set for terminal 103 (DN 203) and determines from column 220 or 230 an address for terminal set 102. In some implementations, the call processing module 70 is responsible for retrieving the address of the first backup network device and for providing instructions for connecting to the first backup network device. The terminal set 101 then initiates a call to the terminal set 102 by attempting to establish a connection using the address of terminal set 102 (step 610). At step 615, if the attempt of step 610 is successful and a connection is established with terminal set 102, the call is processed by terminal set 102 (step 651). At step 615, if the attempt of step 610 fails, then terminal set 101 looks up its routing table 200 to determine from column 270 that terminal set 104 (DN 204) is to serve as a second backup terminal set for terminal set 103 (DN 203) and to determine from column 220 or 230 an address for the terminal set 104. The terminal set 101 then initiates a call to terminal set 104 by attempting to establish a connection using the address of terminal set 104 (step 620). At step 625, if the attempt is successful and a connection is established with terminal set 104, the call is processed by terminal set 104 (step 652). At step 625, if the attempt of step 620 is unsuccessful, a determination of whether the generic call processing capability is enabled is determined (step 630). At step 630, if the generic call processing capability is enabled a connection is established locally, a generic voice mail greeting is played and a voice mail message from the caller initiating the call at terminal set 101 is recorded and later sent to terminal set 103 when terminal set 103 becomes available (step 640). At step 630, if the generic voice mail functionality is disabled a error tone such as a fast busy is played to the caller at terminal set 101 (step 660).

The method of FIG. 6 describes how a network device attempts to establish a call and in some cases the call is answered by way of voice mail. The manner in which a network device processes a call received using voice mail functionality will now be described.

Figure 7:
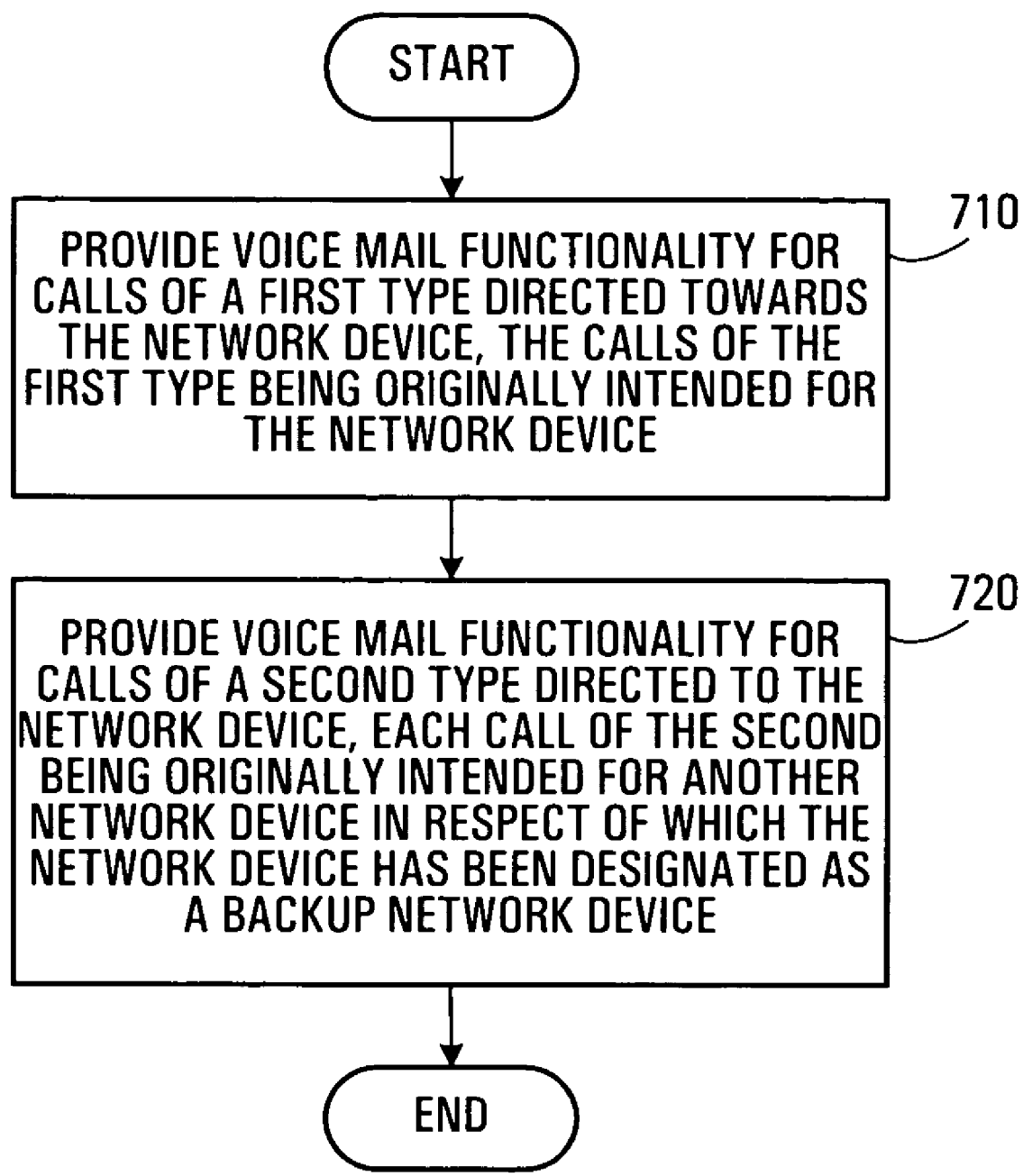
FIG. 7 is a flow chart of a method of implementing voice mail at a network device, in accordance with an embodiment of the invention.

Referring to FIG. 7, shown is a method of implementing voice mail at a network device, in accordance with an embodiment of the invention. At step 710, a network device provides voice mail functionality for calls of a first type directed to the network device. The calls of the first type are originally intended for the network device. At step 720, the network device provides voice mail functionality for calls of a second type directed to the network device. Each call of the second type is originally intended for an other network device of at least one other network device in respect of which the network device has been designated as a backup network device.

In some embodiments of the invention, the network device also receives calls of a third type locally and provides voice mail functionality for the calls of the third type. Each call of the third type is initiated locally at the network device; however, the call of the third type cannot be sent to a destination network device for which the call is intended nor can it be sent to any network device designated as a backup network device for the destination network device.

The method of FIG. 7 is implemented at any suitable network device such as a terminal set, a TTI, a switch based telephone, a packet based telephone, a VoIP (Voice over Internet Protocol) telephone, a server, a PC, a PDA (Personal Digital Assistant), and a wireless telephone for example.

Example, network devices also include but are not limited to terminal sets 101, 102, 103, 104, and the TTI 40 of FIG. 1. The method of FIG. 7 may be implemented on a network device in a number of ways. An example implementation will now be described in which the method of FIG. 7 is implemented in the voice mail module 80 of FIG. 3; however, it is to be clearly understood that the invention is not limited to such an implementation and that there are other possible implementations. In particular, it is to be understood that the invention is not limited by the number of call processing features provided by the network device in which the method of FIG. 3 is implemented and that the structure of the network device may vary depending on the call processing functionality being provided. For example, in other implementations the voice mail functionality of the method of FIG. 7 is implemented on a network device having any combination of the call processing functions of FIG. 3 or any combination of the call processing functions of FIG. 3 and other network device functions. In yet other implementations, the method of FIG. 7 is implemented on a network device that provides voice mail functionality and network device functionality for other features than those of FIG. 3.

Figure 8:
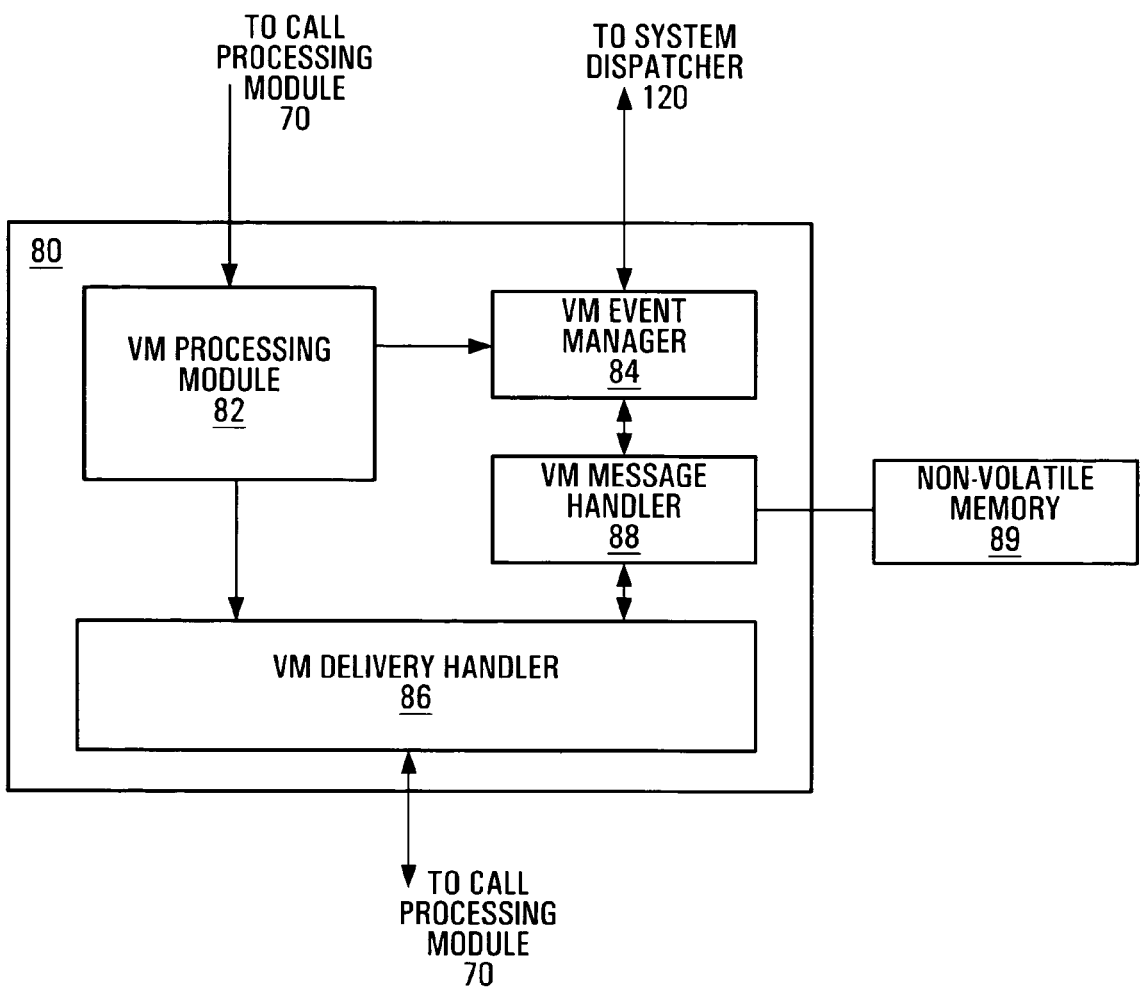
FIG. 8 is a functional block diagram of a voice mail module of FIG. 3.

Referring to FIG. 8, shown is a functional block diagram of the voice mail module 80 of FIG. 3. The voice mail module has a VM (Voice Mail) processing module 82, a VM event manager 84, a VM message handler 88 capable of accessing a non-volatile memory 89, and a VM delivery handler 86. The VM processing module 82 and the VM delivery handler 86 interface with the call processing module 70, and the VM event manager 84 interfaces with the system dispatcher 120 of FIG. 3. The structure of the functional block diagram of FIG. 8 is shown to illustrate how voice mail functionality can be delivered by the voice mail module 80 and it is to be clearly understood that the invention is not limited to the structure shown in FIG. 8. For example, in some embodiments of the invention any two or more of the VM processing module 82, the VM event manager 84, the VM message handler 88, and the VM delivery handler 86 form a single module. Furthermore, in FIG. 8 the voice mail module 80 is described for implementation in a network device that has other call processing functionality and the voice mail module 80 interfaces with both the call processing module 70 and the system dispatcher 120; however, as discussed above the invention is not limited to implementations on a network device implementing the features of FIG. 3. As such, modifications and variations the to voice mail module 80 are possible. For example, in some embodiments of the invention at least some of the call processing functionality provided by the call processing module 70 is provided by the voice mail module 80. Similarly, in some embodiments of the invention at least some of the functionality provided by the system dispatcher 120 is provided by the voice mail module 80.

The VM processing module 82 receives a call from the call processing module 70, plays a greeting to a caller and records a message. Once a message is taken by the VM processing module 82, it is saved within a mailbox in the non-volatile memory 89 using the VM event manager 84 and the VM Message Handler 88. The VM processing module 82 then notifies the system dispatcher 120 of a new message via the VM event handler 84. The VM Message Handler 88 is responsible for the management of the messages in the terminal set's mailbox. The VM processing module 82 takes messages for other network devices. Calls handed off to the VM processing module 82 for which messages are recorded are scheduled for delivery to their respective destinations by the VM Delivery Handler 86. The VM Delivery Handler 86 may also receive messages from other network devices. The VM Event Manager 84 handles messages to and from the system dispatcher 120. In particular, the VM Event Manager 84 is responsible for indicating newly arrived messages, any status change, retrieved messages and for initiating playback of messages.

In the embodiment of FIG. 8, the non-volatile memory 89 resides locally on a network device and corresponds for example to the non-volatile flash memory 540 of FIG. 2. However, in some embodiments of the invention the non-volatile memory 89 resides at a central location on another network device and the VM Message Handler 88 is used to send voice mail messages to the central location for storage. The central location might be on a network device such as such as a telephone, a file server or a PC (Personal Computer) for example, designated as the central location for storing the voice mail messages for the network devices within a network. Although the voice mail messages are stored at the designated network device, this is different than conventional voice mail systems in that processing of voice mail is performed locally and on a peer-to-peer basis as opposed to being performed at a central call processing equipment. Such embodiments of the invention provide a hybrid between conventional systems having traditional centralized voice mail storage and a distributed peer-to-peer voice mail system.

In some embodiments of the invention, a network device receives an incoming call that intended for the network device or that was originally intended for another network device for which the network is designated as a backup network device. In some embodiments of the invention, the network device is also capable of receiving locally a call that was destined for another network device but could not be delivered. Upon receipt of the call the network device retrieves a greeting, the call is answered with the greeting and a voice mail message is recorded and saved. In some embodiments of the invention the greeting being retrieved and played depends on the network device for which the call is intended or was originally intended. An illustrative example will now be described with reference to FIG. 9; however, it is to be understood that the example of FIG. 9 is only one specific example and as will be discussed below there are numerous possible variations.

Figure 9:
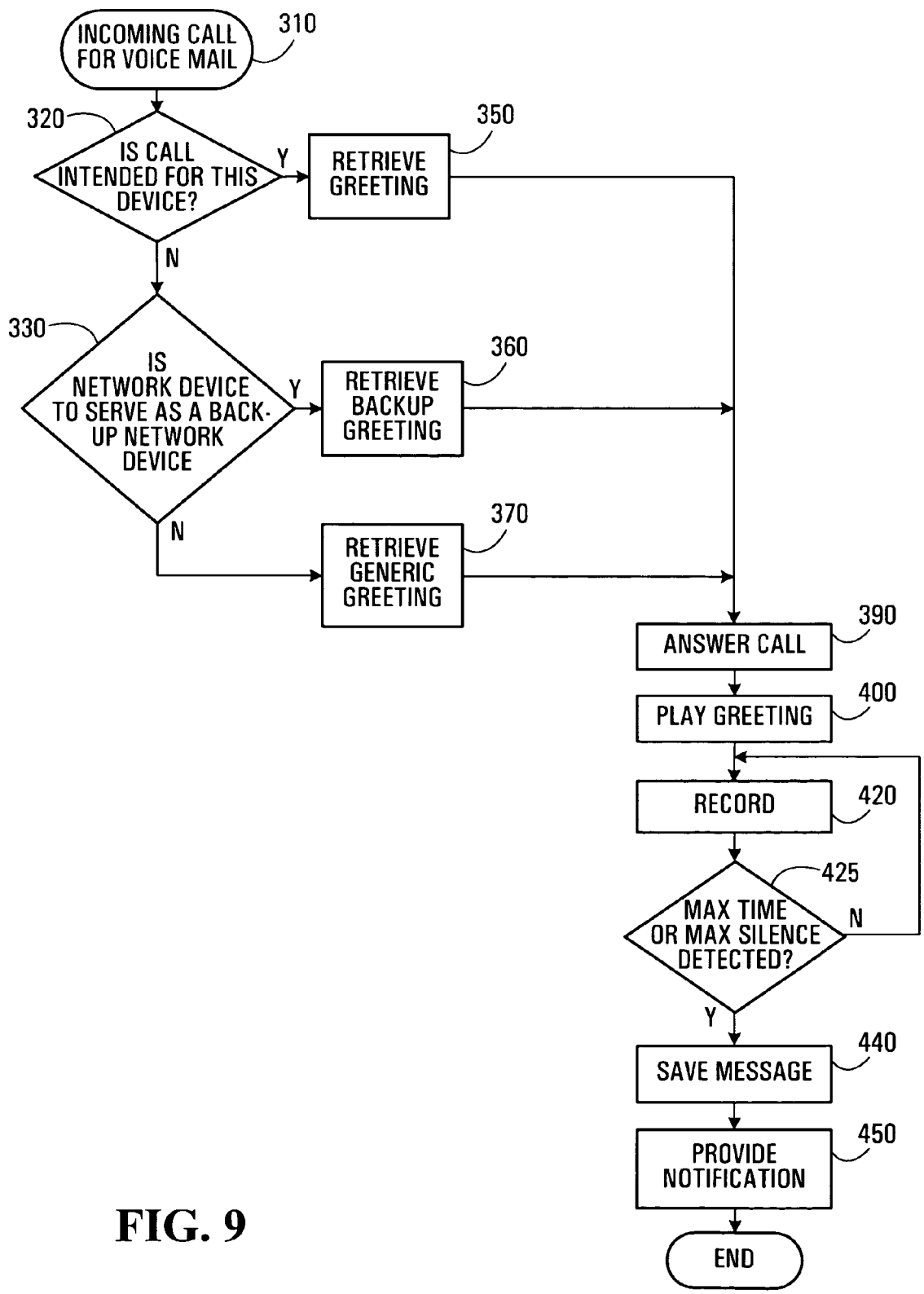
FIG. 9 is a flow chart of an example method of processing a call intended for voice mail in a distributed peer-to-peer call processing system.

Referring to FIG. 9, shown is a flow chart of an example method of processing a call intended for voice mail in a distributed peer-to-peer call processing system. A network device receives an incoming call that is answered (step 310). In the example, there are three different scenarios for which a call is processed for voice mail: 1) the call is intended to be sent to the network device receiving the call but no one has answered the call within a specified number of rings, after which, the call is optionally answered; 2) the call was originally intended for another network device; however, this other network device is unavailable and the network device receiving the call serves as a backup network device; and 3) the call is initiated locally but could not be sent to a destination network device for which the call was intended to be sent or any of the network devices designated as backups for the destination network device. The manner in which the call is processed depends upon the above three scenarios and will now be described.

At step 320, if the call is intended for the network device receiving the call (scenario 1)), a greeting (step 350) specific to the network device receiving the call is retrieved. The call is then answered (step 390) and the greeting is played (step 400). While the greeting is being played to the caller (step 400), DTMF (Dual Tone Multi-Frequency) tones are monitored. At step 400, upon detection of a DTMF tone the greeting stops playing and recording of a voice mail message starts (step 420). While the voice mail message is being recorded, a time elapsed since the beginning of the recording and a time of silence are monitored. At step 425 if the time elapsed since the beginning of the recording has not exceeded a maximum time of recording and if the time of silence has not exceeded a maximum time for silence the recording continues (step 420). At step 425, if the time elapsed since the beginning of the recording has exceeded the maximum time of recording or if the time of silence has exceeded the maximum time for silence recording is stopped and the voice mail message is saved (step 440). A notification that a new voice mail message has been recorded is then provided (step 450).

In the specific example, for scenario 2) the call being received bypasses alerts on the network device such as a ringing signal indicating an incoming call. In such a case, at step 310 the call is received from the call processing module and at step 320 the call is identified as being originally intended for another network device from information contained in the call. At step 330 if the network device receiving the call is designated as a backup network device for the network device for which the call was originally intended, a respective greeting for the network device for which the call was originally intended is retrieved (step 360). The call is answered (step 390) and the greeting specific to the network device for which the call was originally intended is played (step 400). At step 400, while the greeting is being played to the caller, upon detection of a DTMF tone the greeting stops playing and recording of a voice mail message begins (step 420). A time elapsed since the beginning of the recording and a time of silence are monitored while the voice mail message is being recorded. At step 425, if the time elapsed since the beginning of the recording has not exceeded the maximum time of recording and if the time of silence has not exceeded the maximum time for silence the recording continues (step 420); otherwise, recording is stopped and the voice mail message is then saved (step 440). A notification is provided indicating that a new voice mail message intended for another network device has been recorded (step 450).

Referring back to step 310, in scenario 3) at step 310 the call is received locally with the network device initiating the call being the same network device as the one receiving the call. At step 320 the call is intended for another network device and at step 330, if the network device receiving the call is designated as a backup network device for the network device for which the call was originally intended, a respective greeting for the network device being backed up is retrieved (step 360); otherwise, a generic greeting is retrieved (step 370). The generic greeting may be for example in the form "the person you are trying to reach is not available please leave a message". The call is then answered (step 390). The retrieved greeting is then played (step 400). At step 400, while the greeting is being played to the caller, upon detection of a DTMF tone the greeting stops playing and recording of a voice mail message begins (step 420). A time elapsed since the beginning of the recording and a time of silence are monitored while the voice mail message is being recorded. At step 425, if the time elapsed since the beginning of the recording has not exceeded the maximum time of recording and if the time of silence has not exceeded the maximum time for silence the recording continues (step 420); otherwise, recording is stopped. The voice mail message is then saved (step 440). A notification is provided indicating that a new voice mail message has been recorded (step 450).

Embodiments of the invention are not limited to the specific example of FIG. 9. In some embodiments of the invention, a generic greeting is retrieved at one or more of steps 350, 360 and played at step 400. In some embodiments of the invention, a network device maintains greetings specific to each other network device on a network and at step 370 retrieves a greeting specific to the network device for which a call is intended but could not be delivered.

To maintain network device specific greetings network devices exchange their greetings. In some embodiment of the invention, when a device is connected to a network, the voice mail module of the network device being connected provides a respective greeting to one or more other network devices that are designated as backup network devices for the network device being connected. Furthermore, the network device receives a respective greeting from one or more other network devices for which the network device being connected is designated as a backup network device. To further maintain network device specific greetings, each time a new greeting is recorded a network device sends the new greeting to its designated backup network devices. In some embodiments of the invention, a network device sends its greeting to each other network device on a network. Alternatively, in some embodiments of the invention, each network device queries other network devices for which it serves as a backup network device to obtain respective greetings from the other network devices. In some embodiments of the invention, each network device queries all other network devices on a network to obtain respective greetings from the other network devices. The queries might be initiated periodically. In some embodiments of the invention, the greetings are sent and received through a peer discovery process by way of messages sent and received, respectively, by a peer discovery module such as the peer discovery module 110 of FIG. 3 for example.

As another illustrative example, the method of FIG. 9 will now be applied to a network device having the voice mail module 80 of FIGS. 3 and 8; however, again it is to be understood that this is only a specific example and that other implementation are possible. At step 310, a call is received for voice mail at a network device. At step 320, the voice mail module 80 determines whether the call is intended for the network device and, if so, the voice mail retrieves a respective greeting for the network device (step 350). If the call was originally intended for another network device then at step 330 the voice mail module 80 determines whether the network device receiving the call is designated as a backup network device for the other network device and, if so, a respective greeting for the other network device is retrieved (step 360); otherwise, a generic greeting is retrieved (step 370). The voice mail module 80 then answers the call (step 390). The voice mail module 80 then plays the retrieved greeting (step 400). At step 400, while the greeting is being played to the caller, upon detection of a DTMF tone the voice mail module 80 stops playing the greeting and records a voice mail message (step 420). The voice mail module 80 monitors a time elapsed since the beginning of the recording and a time of silence while the voice mail message is being recorded. At step 425, if the time elapsed since the beginning of the recording has not exceeded the maximum time of recording and if the time of silence has not exceeded the maximum time for silence the recording continues (step 420); otherwise, the voice mail module 80 stops the recording. The voice mail module 80 then stores the voice mail message (step 440). The voice mail module 80 then provides a notification to the system dispatcher 120 indicating that a new voice mail message has been recorded (step 450).

At step 450, upon notifying the system dispatcher 120 that a voice mail message has been recorded, process steps are performed depending on the type of message being recorded. What happens to the message will now be described with reference to FIGS. 2, 3, and 8.

When a message is recorded by a particular network device for that particular network device, the system dispatcher 120 is notified, and the system dispatcher 120 in turn sets up an appropriate indicator for a user at the particular network device so that the user will know that there is a voice mail message waiting. This might for example simply consist of a light on the network device being illuminated when at least one voice mail message has been stored.

When a voice mail message is recorded in respect of a network device other than the particular network device that has recorded the voice mail message, the voice mail delivery handler 86 later forwards the voice mail message to the network device that was originally destined to receive the voice mail message. In one embodiment, the voice mail delivery handler 86 waits to receive an update indicating that the network device originally destined to receive the voice mail message is up and running, this is of course assuming that the network device originally destined to receive the voice mail message was in some sort of failure mode. Alternatively, if the network device originally destined to receive the voice mail message was simply busy, then the VM delivery handler 86 attempts to later deliver the voice mail message after a short period of time. In some embodiments of the invention, the VM delivery handler 86 periodically check operational status of the network device originally destined to receive the voice mail message and delivers the voice mail message when the network device becomes available. In some embodiments of the invention, the voice mail delivery handler 86 initiates a call to the network device originally destined to receive the voice mail message and then plays the voice mail message back to the voice mail processing module of the network device. In other embodiments of the invention, the voice mail message is delivered as data packets and transmitted over the network. The voice mail module of the network device originally destined to receive the voice mail message then stores the voice mail message in a non-volatile memory. Upon receipt of the voice mail message, the network device then activates an appropriate user indicator so that a user will know that there is a voice mail message waiting.

In some embodiments of the invention, a network device periodically check operational status of each other network device in respect of which the network device has been designated as a backup network device and in respect of which a voice mail message has been recorded A given network device is responsible for obtaining a voice mail greeting from a user of the network device. Typically, it is up to a user to instigate such a process, and the voice mail module 80 recognizes a request from a user to record the greeting for example by way of input from key pad 555, and then records and stores the greeting for the particular network device. The voice mail greeting is then played for all incoming voice mails that are destined for the particular network device.

In some cases a user may be the owner of a voice mail and may wish to listen to his or her voice mail messages. The voice mail messages may reside on any one or more of a primary network device corresponding to the network device for which the voice mail messages were intended and backup network devices for the primary terminal set. When the user is at the primary network device, a password is entered to view and play the voice mail messages on his or her network device. The primary network device also communicates with its designated backup network devices to determine whether there are voice mail messages for the user on the backup network devices. If so, the voice mail module at the primary network device is used to retrieve the voice mail messages residing on the backup network devices and play the voice mail messages to the caller. Once a voice mail message is played, the caller is presented with a voice mail management option. Some of the voice mail management options allows the owner of the voice mail to resave, delete and forward voice messages to another voice mailbox.

When a user wishes to access his or her voice mail messages remotely from another network device, a connection is established with the primary network device and the user enters a voice mail owner identification key (typically this is the "#" key) followed by a password to review the voice mail messages. In the event the primary network device is unavailable, a connection is established with one of the backup network devices for the primary network device and the owner enters a voice mail owner identification key and a password. The backup network device plays voice mail messages residing locally and belonging to the user and communicates with other backup network devices of the primary network device to determine whether there are voice mail messages for the user on the other backup network devices. If so, the voice mail module of the back up network device for which a connection established is used to retrieve the voice mail messages residing on the other backup network devices and play the voice mail messages to the user.

Figure 10:
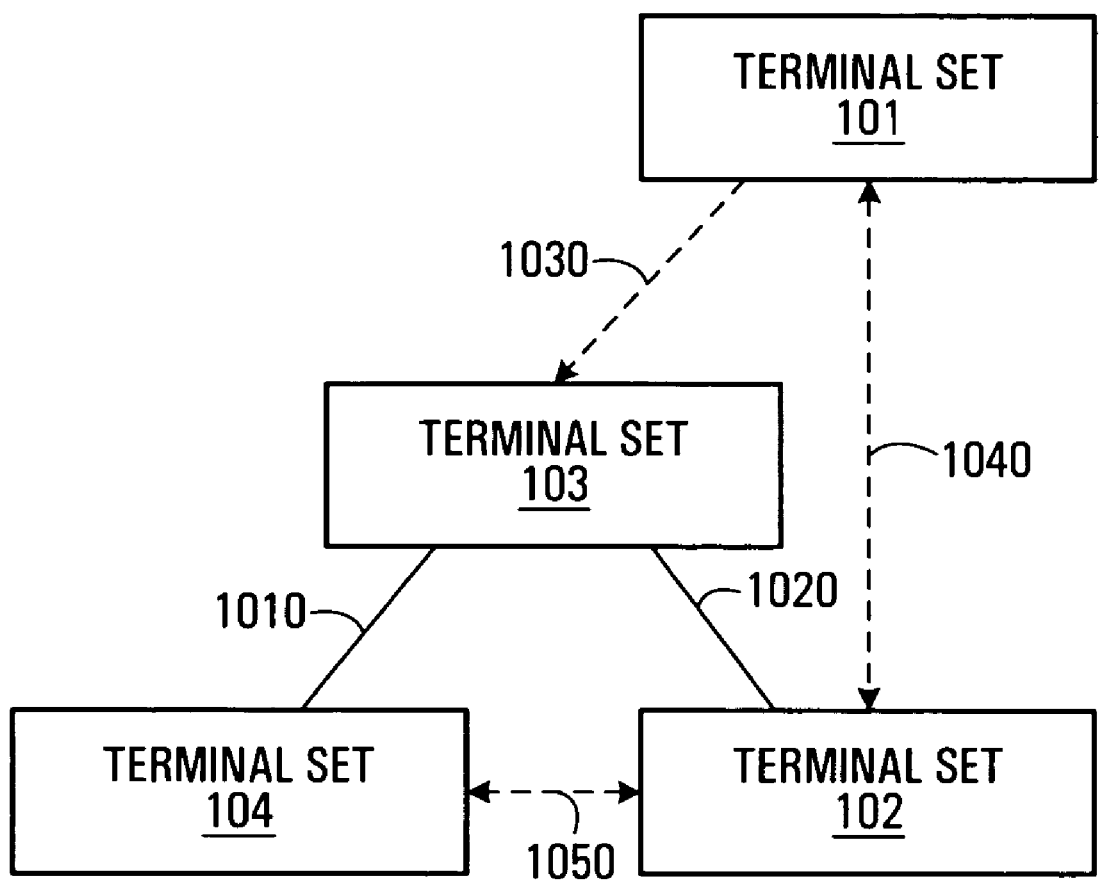
FIG. 10 is a block diagram of some terminal sets of FIG. 1 implementing voice mail functionality.

An illustrative example in which a user attempts to remotely access voice mail messages will now be described with reference to FIG. 10. In FIG. 10, shown are the terminal sets 101, 102, 103, 104. The terminal sets 102, 104 are shown as designated backup terminal sets for terminal set 103 by logical links 1010, 1020. A user at terminal set 101 wishes to remotely access his or her voice mail messages at terminal set 103. Terminal set 101 initiates a connection 1030 with terminal set 103; however, terminal set 103 is unavailable and the connection 1030 cannot be established. Terminal set 101 then looks up its routing table to determine that terminal set 102 is designated as one of the backup terminal sets for terminal set 103. Terminal set 101 then establishes a connection 1040 with terminal set 102 and the user enters a voice mail owner identification key followed by a password. Terminal set 102 plays voice messages residing locally and belonging to the user. Terminal set 102 also establishes a connection 1050 with another backup terminal set for terminal set 103 corresponding to terminal set 104 and communicates with terminal set 104 to determine whether there are voice mail messages for the user at terminal set 104. If so, the voice mail module of terminal set 102 is used to retrieve the voice mail messages residing at terminal set 104 and play the voice mail messages to the user.

In the illustrative example, terminal set 101 obtains voice mail messages stored at terminal sets 102, 104 by communicating directly with terminal set 102. Alternatively, in another case terminal set 101 obtains voice mail messages stored at terminal sets 102, 104 by communicating directly with terminal set 104 and having terminal set 104 retrieve voice mail messages from terminal set 102.

Although embodiments have been described in the context of a distributed peer-to-peer telephone system, embodiments of the invention are also extensible to non-distributed peer-to-peer telephone systems. Furthermore, although embodiments have been described in the context of backup network devices, in other embodiments of the invention backup designations are allocated dynamically wherein a call is directed to any available network device having an appropriate personal greeting. In yet other embodiments of the invention, generic greetings are provided and backup designations are allocated dynamically wherein a call is directed to any available network device capable of providing local voice mail functionality.

Any network device that can be suitably programmed and configured to provide distributed voice mail functionality may be used. Examples of such devices are telephones switches or packet based, VoIP telephones, servers, TTIs, PCs, PDAs (Personal Digital Assistants), and wireless telephones.

Numerous modifications and variations of the present invention are possible in light of the above teachings. It is therefore to be understood that within the scope of the appended claims, the invention may be practised otherwise than as specifically described herein.

The invention claimed is:

1. A network device for use with at least one other network device, the network device being designated as a backup network device for a first one of the at least one other network device, the network device comprising:
   a voice mail module adapted to:
   provide voice mail functionality for calls of a first type directed to the network device, the calls of the first type being originally intended for the network device; and
   provide voice mail functionality for calls of a second type directed to the network device, each call of the second type being originally intended for the first one of the at least one other network device.

2. A network device according to claim 1 wherein the voice mail module is further adapted to:
   receive calls of a third type locally, each call of the third type being initiated locally at the network device being unable to be sent to a destination network device for which the call of the third type is intended and being unable to be sent to any network device designated as a backup network device for the destination network device; and provide voice mail functionality for the calls of the third type.

3. A network device according to claim 1 wherein for each call of the first type, responsive to receiving the call of the first type the voice mail module is adapted to record a voice mail message for the network device.

4. A network device according to claim 3 wherein for each call of the second type, responsive to receiving the call of the second type the voice mail module is adapted to record a voice mail message for the first one of the at least one other network device.

5. A network device according to claim 1 wherein the voice mail module is adapted to maintain respective greetings for the network device and each of the at least one other network device in respect of which the network device has been designated as a backup network device, and wherein responsive to receiving a call of the calls of the first type and the second type the voice mail module is adapted to play the respective greeting for the network device for which the call was originally intended.

6. A network device according to claim 1 wherein in providing voice mail functionality the voice mail module is adapted to record voice mail messages, play back voice mail messages and provide an indicator to a user of the network device that a message has been stored.

7. A network device according to claim 4 wherein for each call of the second type, the voice mail module is adapted to forward the voice mail message recorded to the first one of the at least one other network device.

8. A network device according to claim 7 wherein the voice mail module is adapted to periodically check operational status of each of the at least one other network device in respect of which the network device has been designated as a backup network device and in respect of which a voice mail message has been recorded.

9. A network device according to claim 1 comprising a non-volatile memory, wherein the voice mail module is further adapted to store voice mail messages in the non-volatile memory.

10. A network device according to claim 1 wherein the voice mail module is further adapted to forward voice mail messages to a central location for storage.

11. A network device according to claim 5 wherein upon connection of the network device within a network, the voice mail module is adapted to:
for each of the at least one other network device, retrieve the respective greeting for the at least one other network device from the at least one other network device.

12. A network device according to claim 5 wherein, upon connection of the network device within a network, the voice mail module is adapted to provide the respective greeting for the network device to the at least one other network device that is designated as a backup network device for the network device.

13. A network device according to claim 1 wherein the voice mail module is further adapted to provide voice mail functionality for a second one of the at least one other network device in respect of which the network device has not been designated as a backup network device, by playing a generic voice mail greeting and recording a received voice mail message for later delivery.

14. A network device according to claim 1 wherein the voice mail module is further adapted to retrieve and play voice mail messages stored on a third one of the at least one other network device the third one of the at least one other network device being designated as a backup network device for the network device.

15. A network device according to claim 1 wherein the voice mail module is further adapted to retrieve and play first voice mail messages originally intended for a second network device of the at least one other network device in respect of which the network device is designated as a backup network device.

16. A network device according to claim 15 wherein the voice mail module is further adapted to:
retrieve second voice mail messages originally intended for the second network device from a third one of the at least one other network device designated as a backup network device for the second network device; and
play the second voice mail messages.

17. A network device according to claim 1 wherein the network device is a terminal set.

18. A network device according to claim 1 wherein the network device is a VoIP (Voice over Internet Protocol) telephone.

19. A network device according to claim 1 wherein the network device is one of a switch based telephone, a packet based telephone, a video phone, a TTI (Thin Trunk Interface), a gateway device, a PC (Personal Computer), a server, a PDA (Personal Digital Assistant), a wireless device, and a wireless telephone.

20. A voice mail system within a network, the voice mail system comprising:
a first network device;
a second network device; and
a voice mail module adapted to:
provide voice mail functionality for calls of a first type directed to the first network device, the calls of the first type being originally intended for the first network device; and
provide voice mail functionality for calls of a second type directed to the first network device, each call of the second type being originally intended for the second network device the first network device being designated as a backup network device for the second network device.

21. A voice mail system according to claim 20 wherein the voice mail module is further adapted to:
receive calls of a third type at the first network device, each call of the third type being initiated at the first network device being unable to be sent to a destination network device for which the call of the third type is intended and being unable to be sent to any network device designated as a backup network device for the destination network device; and
provide voice mail functionality for the calls of the third type.

22. A voice mail system according to claim 20 wherein for the first network device:
for each call of the first type, responsive to receiving the call of the first type the voice mail module is adapted to record a voice mail message for the first network device.

23. A voice mail system according to claim 22 wherein for the first network device:
for each call of the second type, responsive to receiving the call of the second type the voice mail module is adapted to record a voice mail message for the second network device.

24. A voice mail system according to claim 20 including a plurality of additional network devices, wherein for the first network device, the voice mail module is adapted to maintain respective greetings for the first network device and each of the plurality of additional network devices in respect of which the first network device has been designated as a backup network device, and wherein responsive to receiving a call of the second type the voice mail module is adapted to play the respective greeting for the one of the plurality of additional network devices for which the call was originally intended.

25. A voice mail system according to claim 20 wherein the voice mail module is adapted record voice mail messages, play back voice mail messages and provide an indicator to a user of the first and second network devices that a message has been stored.

26. A voice mail system according to claim 23 wherein for the first and second network devices:
   for each call of the second type, the voice mail module is adapted to forward the voice mail message recorded to the network device for which the call of the second type was originally intended.

27. A voice mail system according to claim 24 wherein upon connection of the first network device within the network, the voice mail module is adapted to retrieve respective greetings from at least some of the plurality of other network devices.

28. A voice mail system according to claim 24 wherein upon connection of the first network device within the network, the voice mail module is adapted to provide the respective greeting for the first network device to at least some of the plurality of other network devices.

29. A voice mail system according to claim 20 wherein the first and second network devices comprise a respective non-volatile memory, the voice mail module being adapted to store voice mail messages in the non-volatile memory.

30. A voice mail system according to claim 20 further comprising:
   a third network device designated as a central location and having storage means for storing voice mail messages;
   wherein for each of the first and second network devices, the voice mail module is adapted to forward the voice mail messages to the central location for storage.

31. A voice mail system according to claim 20 wherein the voice mail module is further adapted to retrieve and play voice mail messages for the second network device stored on the first network device.

32. A system according to claim 20 wherein each one of the first and second network devices is a terminal set.

33. A system according to claim 20 wherein each one of the first and second network devices is a VoIP (Voice over Internet Protocol) telephone.

34. A system according to claim 20 wherein each of the first and second network devices is one of a switch based telephone, a packet based telephone, a video phone, a TTI (Thin Trunk Interface), a gateway device, a PC (Personal Computer), a server, a PDA (Personal Digital Assistant), a wireless device, and a wireless telephone.

35. A method of implementing voice mail comprising:
   at a network device:
   providing voice mail functionality for calls of a first type directed to the network device, the calls of the first type being originally intended for the network device; and
   providing voice mail functionality for calls of a second type directed to the network device, each call of the second type being originally intended for an other network device of at least one other network device in respect of which the network device has been designated as a backup network device.

36. A method implemented within a first network device for processing a call comprising:
   receiving the call;
   if the call is for the first network device:
   (i) generating an alert on the first network device;
   (ii) if the call is not answered, retrieving a voice mail greeting for the first network device and playing the voice mail greeting;
   (iii) recording a first voice mail message for later playback;
   (iv) generating a voice mail indicator;
   if the call was originally destined for a second network device in respect of which the first network device is designated as a backup network device:
   (i) retrieving a greeting specific to the second network device to which the call was originally destined and playing the greeting specific to the second network device;
   (ii) recording a second voice mail message;
   (iii) forwarding the second voice mail message to the second network device at a later time.

37. A method of according to claim 36 further comprising:
   if the call was originally destined for a third network device other than the first network device and other than any network device in respect of which the first network device is designated as a backup network device:
   (i) retrieving a generic greeting and playing the generic greeting;
   (ii) recording a third voice mail message; and
   (iii) forwarding the third voice mail message to the third network device at a later time.

38. A computer readable recording medium having computer readable program code means embodied therein for implementing voice mail at a network device, the computer readable code means comprising:
   computer readable code means for providing voice mail functionality for calls of a first type directed to the network device, the calls of the first type being originally intended for the network device; and
   computer readable code means for providing voice mail functionality for calls of a second type directed to the network device, each call of the second type being originally intended for an other network device of at least one other network device in respect of which the network device has been designated as a backup network device.

39. A computer readable recording medium according to claim 38 wherein the computer readable code means further comprises:
   computer readable code means for receiving calls of a third type locally, each call of the third type being initiated locally at the network device being unable to be sent to a destination network device for which the call of the third type is intended and unable to be sent to any network device designated as a backup network device for the destination network device; and
   computer readable code means for providing voice mail functionality for the calls of the third type.

40. A computer readable recording medium according to claim 38 wherein for each call of the first type, the computer readable code means further comprises computer readable code means for:
   responsive to receiving the call of the first type, recording a voice mail message for the network device.

41. A computer readable recording medium according to claim 40 wherein for each call of the second type, the computer readable code means further comprises computer readable code means for:
   responsive to receiving the call of the second type, recording a voice mail message for the other network device for which the call of the second type was originally intended.

42. A computer readable recording medium according to claim 38 wherein the computer readable code means further comprises:
- computer readable code means for maintaining respective greetings for the network device and each other network device in respect of which the network device has been designated as a backup network device; and
- computer readable code means for: responsive to receiving a call of the calls of the first type and the second type, playing the respective greeting for the network device for which the call was originally intended.

43. A computer readable recording medium according to claim 38 wherein the computer readable code means further comprises computer readable code means for recording voice mail messages, playing back voice mail messages and providing an indicator to a user of the network device that a message has been stored.

44. A computer readable recording medium according to claim 41 wherein for each call of the second type, the computer readable code means further comprises computer readable code means for forwarding the voice mail message recorded to the other network device for which the call of the second type was originally intended.

45. A computer readable recording medium according to claim 44 wherein the computer readable code means further comprises computer readable code means for periodically checking operational status of each other network device in respect of which the network device has been designated as a backup network device and in respect of which a voice mail message has been recorded.

46. A computer readable recording medium according to claim 38 wherein the computer readable code means further comprises computer readable code means for storing voice mail messages locally at the network device.

47. A computer readable recording medium according to claim 38 wherein the computer readable code means further comprises computer readable code means for forwarding voice mail messages to a central location for storage.

48. A computer readable recording medium according to claim 42 wherein the computer readable code means further comprises computer readable code means for:
- upon connection of the network device within a network, for each other network device of the at least one other network device retrieving the respective greeting for the other network device from the other network device.

49. A computer readable recording medium according to claim 42 wherein the computer readable code means further comprises computer readable code means for:
- upon connection of the network device within a network, providing the respective greeting for the network device to another network device that is designated as a backup network device for the network device.

50. A computer readable recording medium according to claim 38 wherein the network device is a first network device and wherein the computer readable code means further comprises computer readable code means for providing voice mail functionality for a second network device in respect of which the first network device has not been designated as a backup network device, by playing a generic voice mail greeting and recording a received voice mail message for later delivery.

51. A computer readable recording medium according to claim 38 wherein the computer readable code means further comprises computer readable code means for retrieving and playing voice mail messages stored on at least one network device which is designated as a backup network device for the network device.

52. A computer readable recording medium according to claim 38 wherein the network device is a first network device and wherein the computer readable code means further comprises computer readable code means for retrieving and playing first voice mail messages originally intended for a second network device of the at least one other network device in respect of which the first network device is designated as a backup network device.

53. A computer readable recording medium according to claim 52 wherein the computer readable code means further comprises:
- computer readable code means for retrieving second voice mail messages originally intended for the second network device from at least one other network device designated as a backup network device for the second network device; and
- computer readable code means for playing the second voice mail messages.

* * * * *